Oct. 5, 1926.  
C. L. ROCKWELL  
1,602,171  
AUTOMATIC BRAKING DEVICE  
Filed Nov. 1, 1922   3 Sheets-Sheet 1

WITNESSES

INVENTOR
Chauncey L. Rockwell
BY
ATTORNEYS

Oct. 5, 1926. 1,602,171
C. L. ROCKWELL
AUTOMATIC BRAKING DEVICE
Filed Nov. 1, 1922   3 Sheets-Sheet 2
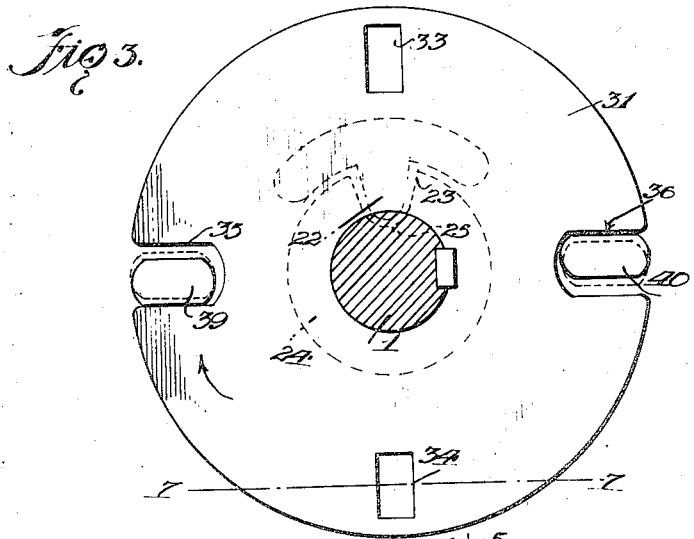
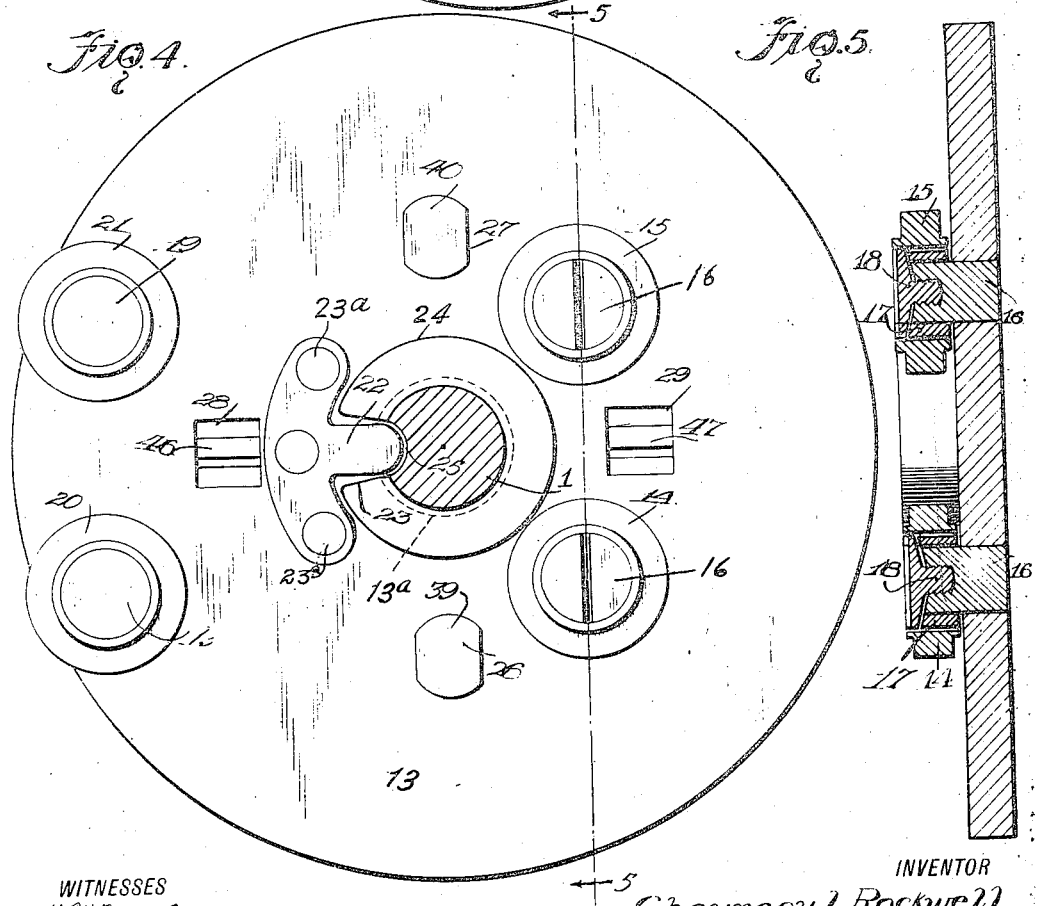
WITNESSES
INVENTOR
Chauncey L. Rockwell
BY
ATTORNEYS

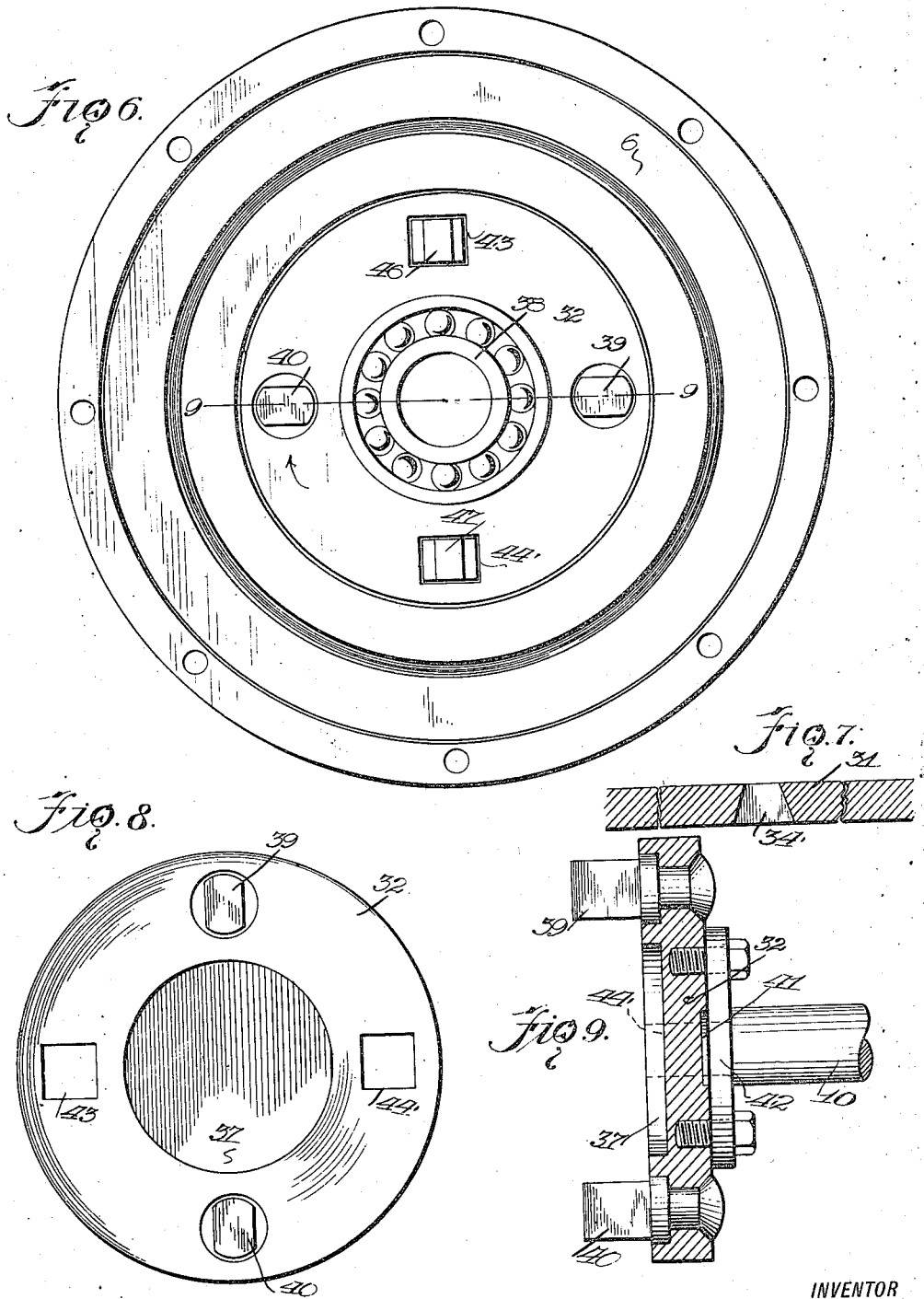

Patented Oct. 5, 1926.

1,602,171

UNITED STATES PATENT OFFICE.

CHAUNCEY L. ROCKWELL, OF ALHAMBRA, ILLINOIS.

AUTOMATIC BRAKING DEVICE.

Application filed November 1, 1922. Serial No. 598,339.

This invention relates to automatic braking devices for automobiles.

An object of the invention is the provision of a device for automatically snubbing the momentum of a motor car at a rate which is proportional to the decreased speed of an engine after the throttle has been closed.

Another object of the invention is the provision of a device for decreasing any amount of momentum of a car within any given period of time without the employment of the usual friction brake as the energy-absorbing agent.

A further object of the invention is to provide an automatic braking device which may be applied in less time than the ordinary friction brake and which will automatically come into action when the engine is stalled.

A still further object of the invention is the provision of a device which will automatically come into action when the engine is stalled to stop an automobile and which is connected with the clutch pedal whereby operation of the clutch pedal will cause the automatic braking device to become inactive.

Other objects and objects relating to details of construction will hereinafter appear.

The invention is illustrated by way of example in the accompanying drawings, in which, Figure is a longitudinal section of an automatic braking device.

Figure 3 is a front view of a driven disc forming part of the braking device.

Figure 4 is a front view of a brake disc which forms part of the automatic braking device.

Figure 5 is a section taken along the line 5—5 of Figure 4.

Figure 6 is a front view of the drive disc in position within the housing which includes the automatic braking device.

Figure 7 is a section taken along the line 7—7 of Figure 3.

Figure 8 is a front view of a drive disc forming part of the automatic braking device.

Figure 9 is a section of the drive disc taken along the line 9—9 of Figure 6.

Figure 2:
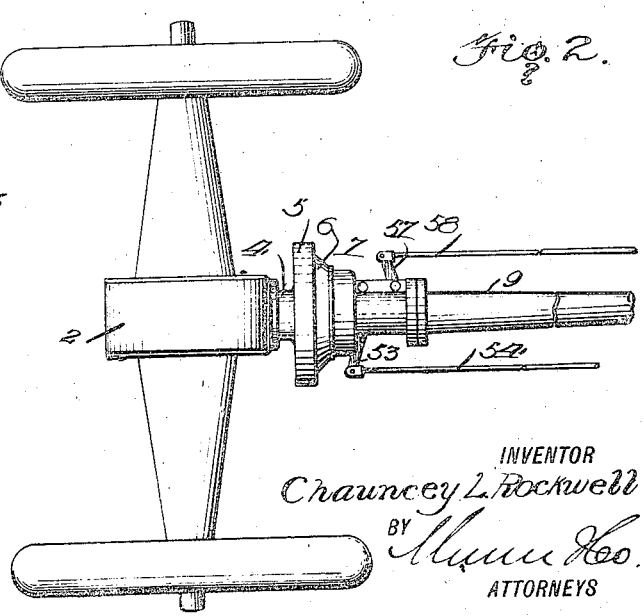
Figure 2 is a plan view of the same shown applied to an automobile.

Referring more particularly to the drawings, 1 indicates a driven shaft on the outer end of which is rigidly mounted the usual bevel gear which is located in the differential housing 2 for driving the differential and likewise the rear axles. The shaft 1 is provided with bearings 3 located in a reduced end 4 of the rear end 5 of a housing. Upon the portion 5 of said housing is rigidly secured by means of bolts an annular plate 6 to which is rigidly bolted the forward end 7 of said housing, the plate 6 forming an intermediate portion of the automatic brake housing. The reduced portion 4 of the housing, which provides a journal for the shaft 1, has a flange 8 adapted to be secured in any approved manner to the differential housing 2 as shown in Figure 2. The forward end 7 of the housing is secured in any approved manner to the torque tube 9 which encloses the drive shaft which ordinarily extends between the transmission housing and the differential housing.

In order to properly position my automatic braking device I have foreshortened the torque tube 9 and inserted the automatic brake housing between the ends of the torque tube and the differential housing 2 while shaft 1 replaces that portion of the drive shaft 10 which has been removed from the said drive shaft in order to attain certain results in the automatic braking device. The annular portion 5 of the housing is internally provided with an annular race 11 and an annular race 12 which is of smaller diameter than the race 11 because of its nearness to the center of the housing.

Mounted on the shaft 1 is a friction disc 13 shown in plan view in Figure 4 which has a slight angular movement with relation to the rotation of said shaft. This friction disc is provided with a pair of rollers 14 and 15 mounted upon stub axles 16 for engagement with the race 12.

As shown more particularly in Figure 5, an eccentric sleeve 17 is mounted on the stub axles 16 with a screw 18 for locking the eccentric sleeve in position on the stub axles. The object of the eccentric sleeve is to move the rollers 14 and 15 closer or farther away from the shaft 1 for adjustably positioning the said rollers with respect to the annular race 12 so that in case of wear of the rollers, said rollers may be properly positioned in order that they will properly engage the race when necessary. Adjacent the periphery of the brake disc 13 are rigidly mounted stub shafts 19 upon which are rotatably mounted respective rollers 20 and 21 which are adapted to engage the race 11 in the portion 5 of the brake housing. The rollers 14, 15, 20 and 21 are adapted to support the brake disc 13 within the brake housing. The central opening 13ª of disk 13 shown more particularly in Figure 4 through which the shaft 1 is inserted is of a larger diameter than the diameter of said shaft, so that the disk is supported at all times by the rollers rather than by the shaft.

Secured on the outer face of the brake disc 13 is a lug 22 disposed along a radius of the disc with the lower end of the lug depending within a slot 23 formed in an annular shoulder 24 which is integral with the shaft 1. The extreme lower end of the lug 22 is adapted to project into a notch 25 in the shaft 1, the notch in the shaft being in alinement with the notch 23 of the shoulder 24. As shown more particularly in Figure 4 there is a certain amount of clearance between the lug 22 and the notches 23 and 25 so that the disc 13 may be rotated slightly relative to the shaft 1 and likewise the shaft 1 may be rotated slightly relative to the disc 13 before the shaft or the disc is moved in either instance.

Figure 1:
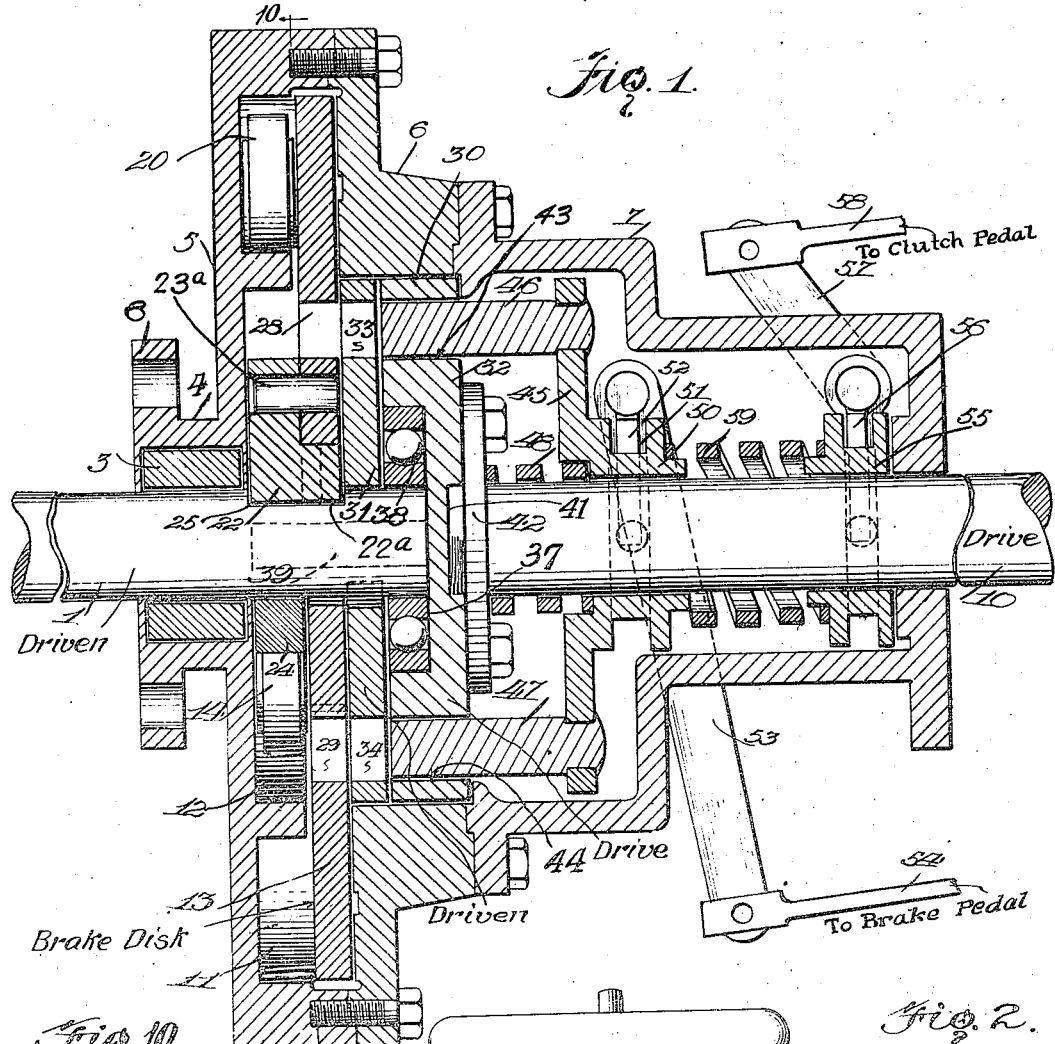
Figure 10:
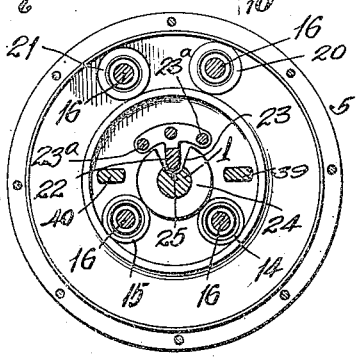
Figure 10 is a vertical section of the braking device taken along the line 10—10 of Figure 1.

As shown in Figure 1, the lug 22 has a portion 22ª which projects laterally from the inner face of the lug 22, and through a corresponding opening in the face of the disk 13. The said opening extends from the periphery of the central passage 13ª of the disk 13. The portion 22ª conforms to the shape of the lower end of the lug 22. The lug 22 is secured to the outer face of disk 13 by means of rivets 23ª.

At diametrically opposite points on the brake disc 13 are formed openings 26 and 27. Likewise at diametrically opposite points are formed openings 28 and 29 in the brake disc 13 but which are spaced at 90° from the respective openings 26 and 27. One face of the brake disc 13 is adapted to abut the inner face of the annular plate 6 which forms part of the brake housing.

As shown in Figure 1 the annular plate 6 is provided with a central perforation 30 which forms a bearing for a driven disc 31 shown in plan view in Figure 3, and a drive disc 32 as shown in plan view in Figure 8. The disc 31 is provided with V-shaped openings 33 and 34 disclosed more particularly in Figure 7 for a purpose which will be presently explained. The disc at its periphery is likewise provided with diametrically disposed notches 35 and 36 which are located at 90° from the respective openings 33 and 34. The driven disc 31 is keyed to the shaft 1 and therefore rotated simultaneously with said shaft. The openings 33 and 34 aline with the respective openings 28 and 29 of the brake disc 13 while the notches 35 and 36 are adapted to respectively aline with the openings 26 and 27 in the brake disc 13. The notches 35 and 36 are wider than the openings 26 and 27 of the brake disc 13.

The drive disc 32 shown more particularly in Figures 8 and 9 is provided with a counter-sunk portion 37 which is adapted to receive a ball bearing unit 38, said unit being adapted to receive the shaft 1. At diametrically opposite points on the driven disc 32 are formed horizontally and outwardly projecting lugs 39 and 40, the lug 39 is adapted to project through the notch 35 in the driven disc 31 and into and neatly fit the opening 26 in the brake disc 13. The lug 40 is adapted to project through the notch 36 of the driven disc 31 and into and neatly fit the opening 27 in the brake disc 13. As shown in Figure 3 the width of the lugs 39 and 40 is less than the width of the slots 35 and 36 of the driven disk 31 so that there will be a clearance between the lugs and the edges of the notches.

The forward face of the disc 32 is provided with a circular recess 41 in which is adapted to seat the reduced end of the shaft 10. The plate 42 is secured to the shaft 10 and bolted to the forward face of the drive disc 32 so that rotation of the shaft 10 will cause rotation of the disc 32. The disc 32 is provided with openings or passages 43 and 44 disposed at diametrically opposite points in the face of the disc 32 and spaced at 90° from the lugs 39 and 40.

Slidably mounted on the shaft 10 is a fork disc 45 which is provided with diametrically and horizontally disposed lugs 46 and 47 which are seated within the respective openings 43 and 44 of the drive disc 32. The openings 43 and 44 in the disc 32 are opposite to the openings 33 and 34 so that as the forked disc 45 is shifted along the shaft 10 the reduced ends of the lugs 46 and 47 are adapted to project within the respective V-shaped slots 33 and 34 of the driven disc 31.

The coil spring 48 on the shaft 10 is located between the flange 42 and the forked disc 45 for forcing the forked disc 45 away from the drive disc 32 to maintain the reduced ends of the lugs 46 and 47 out of the V-shaped openings 33 and 34 of the driven disc 31.

A boss 50 is formed on the forward face of the fork disc 45 and provided with an annular groove 51 adapted to receive a fork 52 which is operated by a link 53. The link 53 is connected by an operating rod 54 to the usual brake pedal of the automobile.

In the forward end 7 of the housing is located a collar 55 provided with an annular groove in which is adapted to seat the fork 56 operated by a link 57 which is connected by means of a rod 58 to the usual clutch pedal of the automobile. A coil spring 59 mounted on the shaft 10 and located between the collars 50 and 55 is adapted to maintain these collars in spaced relation from each other.

The principle upon which this device operates may be best illustrated by conceiving a device placed in the transmission line of an automobile that will allow the power of the motor to pass unaltered to the rear wheels, but which will not allow any force from the rear wheels to reach the motor;—in other words it is a device which acts as a check-valve in the transmission mechanism to permit power to be transmitted to the rear wheels but which will not permit the rear wheels to transmit power to the motor.

With such a device the speed of the car would conform to that of the motor and since the motor of the vehicle loses its speed within a comparatively short time relative to the time required for the motion of the car to cease this device would cause the car to come to a halt in much less time than would be required for a car idly coasting and not equipped with the device.

Now if the device just mentioned were altered in order to throw a braking force upon the motor as soon as the force from the rear wheels tended to pass through the device, the motor itself would stop instantly or be greatly diminished in speed, therefore the car would likewise have its momentum proportionally diminished.

If some form of means were employed in this device in a manner to permit the force of the motor caused by the exploding gases to overcome the force thrown upon the motor by the rear wheels the braking speed of the device would be proportional to the suddenness of the throttle closing. In other words, if the momentum of the motor is balanced and the momentum of the car kept from rotating the motor the slowing down of the car would be directly proportioned to the rapidity with which the throttle is closed.

Referring to the general operation of the device it will be seen that power from the drive shaft 10 is transmitted through the drive disc 32, the respective horizontal lugs 39 and 40 being engaged by the side edges of the slots 35 and 36 of the driven disc 31 as shown in Figure 3. Since the disc 31 is keyed to the shaft 1 motion is directly transmitted from shaft 10 to shaft 1 through the disc 31 and lugs 39 and 40.

The clearance between the lug 22 secured to the brake disc 13 and the notches 23 and 25 of the shaft and the shoulder 24, respectively, will permit the lug 22 to move to a point which is in the center between the sides of the notches when the lugs 39 and 40 are engaged by one of the side edges of the notches 35 and 36 so that the force is applied directly through the driven disc 31 with the lug 22 out of engagement with the notches in the shoulder 24 and the shaft 1.

The lugs 39 and 40 extend directly through the openings 26 and 27 of the brake disc 13 so that as the lugs 39 and 40 are moved by the drive disc 32 the brake disc likewise will be rotated.

As long as the brake disc 13 is rotated by mechanism which engages the brake disc at diametrically opposite points and at a distance from the center of the brake disc, the rollers 14 and 15 will not bind on the race 12 and the rollers 20 and 21 will not bind on the race 11.

If at any time the engine should be stalled and the automobile be moving at a certain rate of speed the rear wheels would tend to transmit motion from the shaft 1 to the shaft 10 and thereby continue to rotate the engine. When there is any tendency for the motion to be transmitted from the rear wheels to the shaft 10 and likewise to the motor, rotation of the shaft 10 through the rear wheels will cause one side of the notches 23 and 25 to engage the lug 22 and thereby tend to rotate the brake disc 13. Now since the lugs 39 and 40 are engaged within the openings 26 and 27 of the brake disc 13, partial rotation of brake disc 13 will cause the lugs 39 and 40 to move away from their engagement with the sides of the notches 35 and 36 and move to the position shown in dotted lines in Figure 3 so that the side edges of the notches 35 and 36 will be out of engagement with the lugs 39 and 40.

When this condition occurs and the shaft 1 is rotated from the rear wheels causing the notches 23 and 25 to engage the lug 22 the brake disc will tend to rotate and be shifted bodily towards the lower left hand corner in Figure 4 force the rollers 14 and 20 into engagement with the respective races 12 and 11 while the rollers 15 and 21 will engage with less force their respective races. The rollers 14 and 15 being near the center of the brake disc 13 will grip the race 12 more securely than will the rollers 20 and 21 and thereby act as a brake to prevent rotation of the shaft 1 and likewise of the shaft 10 and the motor of the automobile.

It will be seen that if at any time the motor should stall or be disconnected from the drive shaft 10, the momentum of the automobile would tend through the rear wheels to drive shaft 1 and likewise shaft 10 and since the brake disc 13 resists transmission of the motion from the rear wheels to the shaft 10, said brake disc 13 would through its rollers 14, 15, 20 and 21 engaging their respective races in the brake housing, immediately operate to stop the automobile. This would happen when the clutch was thrown out for changing the gears.

Therefore, I have connected the clutch pedal by means of a rod 58, link 57 to the sliding collar 55. When released, the clutch will force the collar 55 rearwardly and likewise force disc 45 and lugs 46 and 47 through the V-shaped openings 33 and 34 in the driven disc 31 and thereby lock the driven disc 31 rigidly with the drive disc 32 and therefore the shafts 1 and 10. This condition permits the shaft 1 to transmit motion from the rear wheels to the shaft 10 which is necessary at this time when shifting gears otherwise the device would be stalled at each time an attempt would be made to shift the gears.

The operating lever 53 connected by the link 54 to the brake pedal is adapted to be operated when the brake pedal is moved in order to compress spring 59 and force the forked disc 45 rearwardly and the lugs 46 and 47 out of the respective V-shaped openings 33 and 34 of the driven disc 31. When this position of the parts is had the braking device will come once more into play and cause the brake disc 13 to jam the rollers 14 and 15 into engagement with the race 12 and retard the speed of the car. The rollers 20 and 21 also frictionally engage the race 11 but with less friction than the rollers 14 and 15.

It will be noted from Figure 4 that when the shaft 1 revolves the ring 24 and when the side edge of the ring engages the lug 22, the brake disc 13 will be shifted towards the lower left hand corner and eccentrically with respect to the shaft 1 and thereby cause the rollers 14 and 20 to bind against their respective races and with the rollers 15 and 21 engaging with less force their respective races. This is due to the fact that the brake disc has a clearance between the central perforation and the shaft 1 so that the brake disc may be shifted bodily in the direction indicated for locking the brake disc to the housing and preventing rotation of the shafts. It will be noted that the rollers are of the friction type and that the brake disc is shifted along the lines of force which is directly along a radius of a circle so that the rollers are forced rigidly against the races of the housing. Since the brake disc is shifted laterally the rollers are positioned eccentrically with respect to the shaft 1 as is the brake disc so that the rollers will be forced against the race of the housing and thereby prevent further rocking movement or rotation of the brake disc.

It will be seen that when this device is attached as shown in Figure 2 to an automobile, if the car should stall on a hill that the device would immediately come into play and automatically stop the car. By connecting the clutch lever to the lever 57 it is possible by throwing out the clutch to coast down a hill and prevent the automatic braking device from coming into play and checking the same.

What I claim is:

1. In an automatic braking device for automobiles, a housing provided with circular races, a shaft in the housing and provided with a notch, a circular brake disc loosely mounted on the shaft, a lug on the disc depending into the notch and of a size to provide a clearance for the lug in the notch, a pair of rollers mounted on and adjacent the center of the brake disc and engageable at times with one of the circular races in the housing, a circular driven disc keyed on the shaft, in face to face engagement with the brake disc and provided with a pair of diametrically disposed slots formed in its periphery, said brake disc being provided with a pair of diametrically disposed openings in alinement with the slots in the driven disc, a drive shaft in alinement with the first-mentioned shaft, a driving disc in face to face engagement with the driven disc and rigidly connected to the drive shaft, horizontally disposed lugs diametrically secured to a face of the driving disc with each lug projecting through a slot of the driven disc, and respective alined openings in the brake disc, a disc slidably mounted on the second shaft, a pair of diametrically disposed horizontal lugs secured to one face of the slidable disc, the driven disc being provided with a pair of diametrically disposed openings, the drive disc being provided with a pair of diametrically disposed openings in alinement with the last mentioned openings in the driven disc, said lugs of the slidable disc being seated within the pair of openings in the drive disc, and means for moving the slidable disc for projecting the lugs into the openings in the driven disc which are alined with the openings in the drive disc.

2. In an automatic braking device for automobiles, a housing, a shaft mounted for rotation in the housing, a second shaft contiguous to the first mentioned shaft and likewise mounted for rotation within the housing, a brake disc loosely mounted on the first mentioned shaft, means on the brake disc adapted to engage at times with the first mentioned shaft, means connecting the second mentioned shaft with the first mentioned shaft for transmitting motion from the second mentioned shaft to the first mentioned shaft, said means being inoperable when the first mentioned shaft tends to transmit motion through the brake disc to the second mentioned shaft, and means on the brake disc engaging the housing to prevent rotation of the first mentioned shaft when the first mentioned shaft tends to rotate the brake disc and the second shaft.

3. In an automatic breaking device for automobiles, a housing, a shaft mounted for rotation in the housing, a second shaft contiguous to the first mentioned shaft and likewise mounted for rotation within the housing, a brake disc loosely mounted on the first mentioned shaft, means on the brake disc adapted to engage at times with the first mentioned shaft, means connecting the second mentioned shaft with the first mentioned shaft, and means on the brake disc engaging the housing to prevent rotation of the first mentioned shaft when the first mentioned shaft tends to rotate the brake disc and the second shaft.

4. In an automatic braking device for automobiles, a housing, a shaft mounted for rotation in the housing, a second shaft comprising the drive shaft of the automobile having one end mounted in the housing, means in the housing adapted to connect the first shaft with the drive shaft for transmitting motion from the drive shaft to the first shaft, and means adapted at times to engage the first shaft to lock said shaft to the housing.

5. In an automatic braking device for automobiles, a housing, a shaft mounted for rotation in the housing, a second shaft comprising the drive shaft of the automobile having one end mounted in the housing, means in the housing adapted to connect the first shaft with the drive shaft for transmitting motion from the drive shaft to the first shaft, and means adapted to be actuated by the first shaft to lock said shaft to the housing.

6. In an automatic braking device for automobiles, a housing, a shaft mounted for rotation in the housing, a second shaft comprising the drive shaft of the automobile, having one end mounted in the housing, means in the housing adapted to connect the first shaft with the drive shaft for transmitting motion from the drive shaft to the first shaft and means rotated by the drive shaft and rotatable with the first shaft adapted to be rotated by the first shaft and to lock said shaft to the housing.

7. In an automatic braking device for automobiles, a housing, a shaft mounted for rotation in the housing, a second shaft comprising the drive shaft of the automobile, having one end mounted in the housing, means in the housing adapted to connect the first shaft with the drive shaft for transmitting motion from the drive shaft to the first shaft, a disk mounted on the first shaft, rotated by the drive shaft, and rotatable with the first shaft, means on the disk engageable with the first shaft at times for causing the disk to lock with the housing and prevent rotation of the first shaft.

8. In an automatic braking device for automobiles, a housing, a shaft mounted for rotation in the housing, a second shaft comprising the drive shaft of the automobile, having one end mounted in the housing, means in the housing adapted to connect the first shaft with the drive shaft for transmitting motion from the drive shaft to the first shaft, a disk mounted on the first shaft and rotated by the drive shaft, the first shaft being provided with a groove, a lug on the disk depending into the groove and out of contact with the sides of the groove, and means on the disk engageable with the housing for locking the first shaft and disk with the housing when the lug engages the side of the groove as the first shaft tends to transmit motion to the drive shaft.

9. In an automatic braking device for automobiles, the combination with a drive shaft, a driven shaft, a clutch pedal actuated lever, a housing, the driveshaft having one end mounted for rotation in the housing, means in the housing adapted to connect the drive shaft with the driven shaft for transmitting motion from the drive shaft to said driven shaft, means adapted at times to engage the driven shaft to lock said shaft to the housing, and means connecting said locking means with the clutch pedal actuating lever for preventing the locking means from locking the driven shaft to the housing when the lever has been released.

10. In an automatic braking device for automobiles, the combination with a drive shaft, a driven shaft, a clutch pedal actuated lever, a housing, the drive shaft having one end mounted for rotation in the housing, means in the housing adapted to connect the drive shaft with the driven shaft for transmitting motion from the drive shaft to said driven shaft, a disc mounted on and rotatable with the driven shaft adapted to be rotated by the drive shaft, means on the disc engageable with the driven shaft at times for causing the disc to lock the driven shaft to the housing and prevent rotation of said driven shaft, and means connecting the disc with the clutch pedal actuating lever for preventing the disc from locking with the housing when the lever has been released.

11. In an automatic braking device for automobiles, the combination with a drive shaft, a driven shaft, a clutch pedal actuated lever, a housing, means in the housing adapted to connect the drive shaft with the driven shaft for transmitting motion from the drive shaft to said driven shaft, a disc mounted on the driven shaft provided with a lug and rotated by the drive shaft, the driven shaft being provided with a groove, said lug projecting normally in the groove but out of contact with the sides of the groove, and means on the disc engageable with the housing for locking the driven shaft and disc with the housing to prevent rotation of the driven shaft when the lug engages a side of the groove as the driven shaft tends to transmit motion to the drive shaft, and means connecting the disc with the clutch pedal actuating lever for preventing the lug from engaging a side of the groove in the last mentioned shaft when the lever has been released.

12. In an automatic braking device for automobiles, the combination with a drive shaft, a driven shaft, a clutch pedal actuated lever, a housing, means in the housing adapted to connect the drive shaft with the driven shaft for transmitting motion from the drive shaft to said driven shaft, a disc mounted on and rotatable with the driven shaft and adapted to be rotated by the drive shaft, an annular shoulder formed integrally with the last mentioned shaft and provided with a groove, the last mentioned shaft being provided with a groove in axial alinement with the groove in the annular shoulder, a lug on the disc depending into the alined grooves and out of contact with the sides of the grooves, friction rollers on the disc adapted to engage the inner wall of the housing for locking the disc and driven shaft with the housing when the lug engages the alined sides of the grooves as the driven shaft tends to transmit motion to the drive shaft.

13. In an automatic braking device for automobiles, the combination with a drive shaft, a driven shaft, a clutch pedal actuated lever, a housing, means in the housing adapted to connect the drive shaft with the driven shaft for transmitting motion from the drive shaft to said driven shaft, a disc mounted on and rotatable with the driven shaft, and adapted to be rotated by the drive shaft when said drive shaft transmits motion to the last mentioned shaft, a pair of friction rollers mounted on the disc adjacent the periphery of the disc, an annular track in the housing adapted to be engaged by the last mentioned pair of friction rollers, and means on the disc and engageable with the driven shaft for causing the pairs of rollers to frictionally engage their respective tracks, and lock the disc and driven shaft against rotation when said driven shaft tends to transmit rotary motion to the drive shaft.

14. In an automatic braking device for automobiles, the combination with a drive shaft, a driven shaft, a clutch pedal actuated lever, a housing, the drive shaft having one end mounted for rotation in the housing, means in the housing adapted to connect the drive shaft with the driven shaft for transmitting motion from the drive shaft to said driven shaft and adapted to be rotated by the drive shaft when said drive shaft transmits motion to the driven shaft, a pair of friction rollers mounted on the disc adjacent the center of the disc, an annular track formed on the inner wall of the housing, and engageable with the friction rollers, a pair of friction rollers mounted on and adjacent the periphery of the disc, an annular track in the housing adapted to be engaged by the last mentioned pair of friction rollers, means on the disc and engageable with the driven shaft for causing the pairs of rollers to frictionally engage their respective tracks, and lock the disc and driven shaft against rotation when the driven shaft tends to transmit rotary motion to the drive shaft, and means for adjusting the position of the first mentioned pair of friction rollers relative to the center of said disc.

15. In an automatic braking device for automobiles, a housing, a drive shaft having one end rotatable in said housing, a driven shaft mounted for rotation within the housing, a brake disc loosely mounted on the driven shaft, the brake disc adapted to engage with the driven shaft for causing the brake disc to engage the housing and prevent rotation of the driven shaft, a driven disc keyed to the driven shaft, a driven disc secured to the drive shaft, a movable means on the drive disc passing through the driven disc and the brake disc and engageable at times with the driven disc for causing rotation of the brake disc from the drive shaft, said means being inoperable to drive the brake disc when the driven shaft tends to transmit motion to the drive shaft, and means on the brake disc adapted to engage with the driven shaft for causing the brake disc to engage the housing and prevent rotation of the driven shaft, when the movable means is inoperatively positioned and the driven shaft tends to transmit motion to the drive shaft.

CHAUNCEY L. ROCKWELL.